(12) United States Patent
Xie et al.

(10) Patent No.: US 10,975,266 B2
(45) Date of Patent: Apr. 13, 2021

(54) FORMULATIONS, METHODS, AND APPARATUS FOR REMOTE TRIGGERING OF FRONTALLY CURED POLYMERS

(71) Applicant: HRL Laboratories, LLC, Malibu, CA (US)

(72) Inventors: Tao Xie, Oak Park, CA (US); Andrew P. Nowak, Los Angeles, CA (US); Thomas Boundy, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 149 days.

(21) Appl. No.: 16/143,637

(22) Filed: Sep. 27, 2018

(65) Prior Publication Data
US 2019/0023945 A1 Jan. 24, 2019

Related U.S. Application Data

(62) Division of application No. 14/556,090, filed on Nov. 28, 2014, now Pat. No. 10,174,223.
(Continued)

(51) Int. Cl.
*C09J 5/06* (2006.01)
*C09J 163/00* (2006.01)

(52) U.S. Cl.
CPC .............. *C09J 5/06* (2013.01); *C09J 163/00* (2013.01)

(58) Field of Classification Search
CPC ... H01L 21/6836; H01L 21/67132; C09J 5/06
(Continued)

(56) References Cited

U.S. PATENT DOCUMENTS

| 4,762,864 A * | 8/1988 | Goel | .................. C08G 59/18 |
| | | | 156/272.4 |
| 5,075,034 A | 12/1991 | Wanthal | |

(Continued)

FOREIGN PATENT DOCUMENTS

EP 0249940 A1 12/1987

OTHER PUBLICATIONS

Mariani et al., "UV-Ignited Frontal Polymerization of an Epoxy Resin," Journal of Polymer Science: Part A: Polymer Chemistry, vol. 42, 2066-2072 (2004).
(Continued)

*Primary Examiner* — Daniel McNally
(74) *Attorney, Agent, or Firm* — O'Connor & Company

(57) ABSTRACT

In some variations, the invention provides a curable adhesive formulation comprising a curable liquid precursor capable of frontal polymerization, wherein the liquid precursor comprises a monomer and a polymerization catalyst, and frontal-polymerization-triggering susceptors in contact with, or contained within, the liquid precursor. The susceptors may include conducting and/or magnetic solid particles capable of induction heating in the presence of a remotely applied electromagnetic field. Other variations provide a polymer-curing system comprising a curable liquid precursor, frontal-polymerization-triggering susceptors, and an apparatus configured to remotely produce an alternating electromagnetic field in line-of-sight with the susceptors (but not necessarily in line-of-sight with the liquid precursor), thereby generating induction heating to initiate the frontal polymerization. The susceptors may be about 0.1 wt % to about 50 wt % of the curable formulation. Other variations provide a method of curing an adhesive joint through an opaque barrier.

8 Claims, 3 Drawing Sheets

Related U.S. Application Data

(60) Provisional application No. 61/910,297, filed on Nov. 30, 2013.

(58) Field of Classification Search
USPC ...................................................... 156/272.2
See application file for complete search history.

(56) References Cited

U.S. PATENT DOCUMENTS

| | | | |
|---|---|---|---|
| 6,313,237 | B1 | 11/2001 | Pojman et al. |
| 6,533,503 | B2 | 3/2003 | Pfeil et al. |
| 6,543,976 | B1 | 4/2003 | Malofsky et al. |
| 6,660,122 | B1 | 12/2003 | Prakash et al. |
| 8,317,963 | B2 | 11/2012 | Langtry et al. |
| 2001/0018880 | A1* | 9/2001 | Pfeil ..................... C04B 26/02 106/803 |
| 2002/0031644 | A1 | 3/2002 | Malofsky et al. |
| 2003/0027900 | A1 | 2/2003 | Burgel et al. |
| 2006/0062948 | A1 | 3/2006 | Kalishek |
| 2006/0113031 | A1* | 6/2006 | Langtry ................. E21D 20/02 156/293 |
| 2006/0142512 | A1 | 6/2006 | Pojman et al. |
| 2009/0155485 | A1 | 6/2009 | Hoyle et al. |
| 2010/0249404 | A1* | 9/2010 | Friese ..................... C07C 45/69 544/106 |
| 2012/0089180 | A1 | 4/2012 | Fathi et al. |
| 2012/0302657 | A1 | 11/2012 | Moszner et al. |
| 2013/0184379 | A1 | 7/2013 | Stumbe et al. |

OTHER PUBLICATIONS

Miller et al., "Induction heating of FeCo nanoparticles for rapid rf curing of epoxy composites," Journal of Applied Physics 105, 07E714 (2009).

Scognamillo et al., "Frontal Cationic Curing of Epoxy Resins," Journal of Polymer Science: Part A: Polymer Chemistry, vol. 48, 2000-2005 (2010).

Yungwirth et al., "Induction Curing of a Phase-Toughened Adhesive," Army Research Laboratory report ARL-TR-2999 (Jun. 2003).

International Preliminary Report on Patentability, Chapter II of PCT; dated Aug. 14, 2015.

* cited by examiner

FORMULATIONS, METHODS, AND APPARATUS FOR REMOTE TRIGGERING OF FRONTALLY CURED POLYMERS

PRIORITY DATA

This patent application is a divisional application of U.S. patent application Ser. No. 14/556,090, filed on Nov. 28, 2014 (now allowed), which claims priority to U.S. Provisional Patent App. No. 61/910,297, filed on Nov. 30, 2013, each of which is hereby incorporated by reference herein.

FIELD OF THE INVENTION

The present invention generally relates to curable systems and cured polymers suitable for adhesives and other applications.

BACKGROUND OF THE INVENTION

An adhesive is any substance applied to the surfaces of materials that binds them together and resists separation. Adhesives offer many advantages over binding techniques such as sewing, mechanical fastening, or thermal bonding. These include the ability to bind different materials together, to distribute stress more efficiently across the joint, increased design flexibility, and cost effectiveness.

Surface bonding techniques are preferred to mechanical fasteners primarily due to their superior load-transfer characteristics. For high-performance engineering applications, surface bonding is typically achieved using elevated temperature-cure, thermosetting adhesives. These thermosetting adhesives usually require temperatures of 120-200° C. for 5-120 min to complete the bond. The most common ways of heating adhesive bonds are convection ovens, thermal blankets, and radiant heaters.

An ideal adhesive is one that has long pot life, but can be cured immediately when needed. It is also highly desirable for the adhesive to cure without having to submit the entire part assembly to a large oven, thermal blanket, or radiant heater. Furthermore, for energy efficiency, one may also take advantage of the latent reaction heat from the adhesive system to sustain its own curing. Such an adhesive provides tremendous advantage for flexible and efficient manufacturing processes.

Frontal polymerization offers attributes that meet the above requirements. Frontal polymerization is a localized reaction that propagates through the coupling of thermal diffusion and the Arrhenius dependence of an exothermic polymerization reaction. The result is a localized thermal reaction zone that then propagates through the reactants as a thermal wave. Frontal polymerization exploits heat production because of exothermicity of the polymerization reaction itself and its dispersion by thermal conduction. If the amount of dissipated heat is not too great, then a sufficient quantity of energy able to induce the polymerization of the monomer close to the hot zone is provided. The result is the formation of a hot polymerization front capable of self-sustaining and propagating throughout the reactor.

Currently known frontal polymerization can only be triggered by direct (physical) contact to thermal (heat) sources or line-of-sight exposure to UV light. Yet, practical adhesives are often used to bond optically opaque parts for which neither triggered mechanisms is applicable.

Conventional approaches require either direct contact with a heat source (e.g., soldering iron) or line-of-sight exposure (UV light). Most adhesive bonding processes occur in between two optically opaque substrates; thus the approaches in the known art are not applicable. A solution to this problem is needed.

SUMMARY OF THE INVENTION

The present invention addresses the aforementioned needs in the art, as will now be summarized and then further described in detail below.

In Some Variations, the Invention Provides a Curable Formulation (e.g., an Adhesive Formulation) Comprising:

(a) a curable liquid precursor capable of frontal polymerization, wherein the liquid precursor comprises a monomer and a polymerization catalyst; and (b) one or more frontal-polymerization-triggering susceptors in contact with, and/or contained within, the liquid precursor, wherein the susceptors comprise conducting and/or magnetic solid particles capable of induction heating in the presence of a remotely applied electromagnetic field.

In some embodiments, the susceptors are present at a concentration from about 0.1 wt % to about 50 wt % in the curable formulation, such as a concentration from about 5 wt % to about 25 wt % in the curable formulation.

The monomer may be an epoxy resin, for example. The polymerization catalyst may be a latent catalyst, such as a latent catalyst comprising a tertiary amine (e.g., an imidazole compound) and/or a boron trifluoride-amine complex. In some embodiments, the liquid precursor further comprises an accelerator, such as a polyol.

In some embodiments, the formulation comprises a single susceptor region or layer adjacently disposed in contact with the liquid precursor. In these or other embodiments, the formulation comprises multiple susceptors dissolved and/or suspended within the liquid precursor.

The conducting and/or magnetic solid particles may contain a material selected from the group consisting of iron, nickel, zinc, chromium, oxides or alloys containing iron, oxides or alloys containing nickel, oxides or alloys containing zinc, oxides or alloys containing chromium, carbon, and combinations thereof.

Other variations provide a polymer-curing system comprising:

(a) a curable liquid precursor capable of frontal polymerization, wherein the liquid precursor comprises a monomer and a polymerization catalyst; and (b) one or more frontal-polymerization-triggering susceptors in contact with, and/or contained within, the liquid precursor, wherein the susceptors comprise conducting and/or magnetic solid particles capable of induction heating in the presence of an electromagnetic field; and (c) an apparatus configured to remotely produce an alternating electromagnetic field in line-of-sight with the susceptors, thereby generating the induction heating to initiate the frontal polymerization.

In some embodiments, the alternating electromagnetic field is not in line-of-sight with at least a portion of the curable liquid precursor. In certain embodiments, the alternating electromagnetic field is not in line-of-sight with any of the curable liquid precursor.

The susceptors may be present at a concentration from about 0.1 wt % to about 50 wt % in the liquid precursor. The monomer may be, but is not limited to, an epoxy resin. The polymerization catalyst may be a latent catalyst, such as a latent catalyst comprising a tertiary amine (e.g., an imidazole compound) and/or a boron trifluoride-amine complex. In some embodiments, the liquid precursor further comprises an accelerator, such as a polyol.

The system may include a single susceptor region or layer adjacently disposed in contact with the liquid precursor. Alternatively, or additionally, the system may include multiple susceptors dissolved and/or suspended within the liquid precursor.

In some embodiments of the system, the conducting and/or magnetic solid particles contain a material selected from the group consisting of iron, nickel, zinc, chromium, oxides or alloys containing iron, oxides or alloys containing nickel, oxides or alloys containing zinc, oxides or alloys containing chromium, carbon, and combinations thereof.

Other variations provide a method of curing an adhesive joint, the method comprising:

(a) selecting a curable liquid precursor capable of frontal polymerization, wherein the liquid precursor comprises a monomer and a polymerization catalyst;

(b) selecting frontal-polymerization-triggering susceptors to initiate polymerization upon remote command, wherein the susceptors comprise conducting and/or magnetic solid particles capable of induction heating in the presence of an electromagnetic field;

(c) combining the curable liquid precursor and the susceptors, to generate a mixture;

(d) transferring the mixture to an adhesive joint; and (e) applying an electromagnetic signal to remotely initiate polymerization of the precursor, wherein the electromagnetic signal, due to an opaque barrier or for other reasons, is not in line-of-sight with at least a portion of the curable liquid precursor.

In some methods, the electromagnetic signal is not in line-of-sight with any of the curable liquid precursor. Note, however, that this is not a requirement for the method to work. Rather, it represents a practical configuration of remote curing, despite an opaque barrier (if present), that is enabled by the susceptors.

The susceptors are present at a concentration from about 0.1 wt % to about 50 wt % in the mixture, in some embodiments. The mixture may include a single susceptor region or layer adjacently disposed in contact with the liquid precursor. Alternatively, or additionally, the mixture may include multiple susceptors dissolved and/or suspended within the liquid precursor.

The electromagnetic signal is preferably an alternating electromagnetic field. An alternating electromagnetic field (such as, but not limited to, an RF energy field) may be generated to supply the electromagnetic signal to remotely initiate polymerization of the precursor.

DETAILED DESCRIPTION OF EMBODIMENTS OF THE INVENTION

Figure 1:
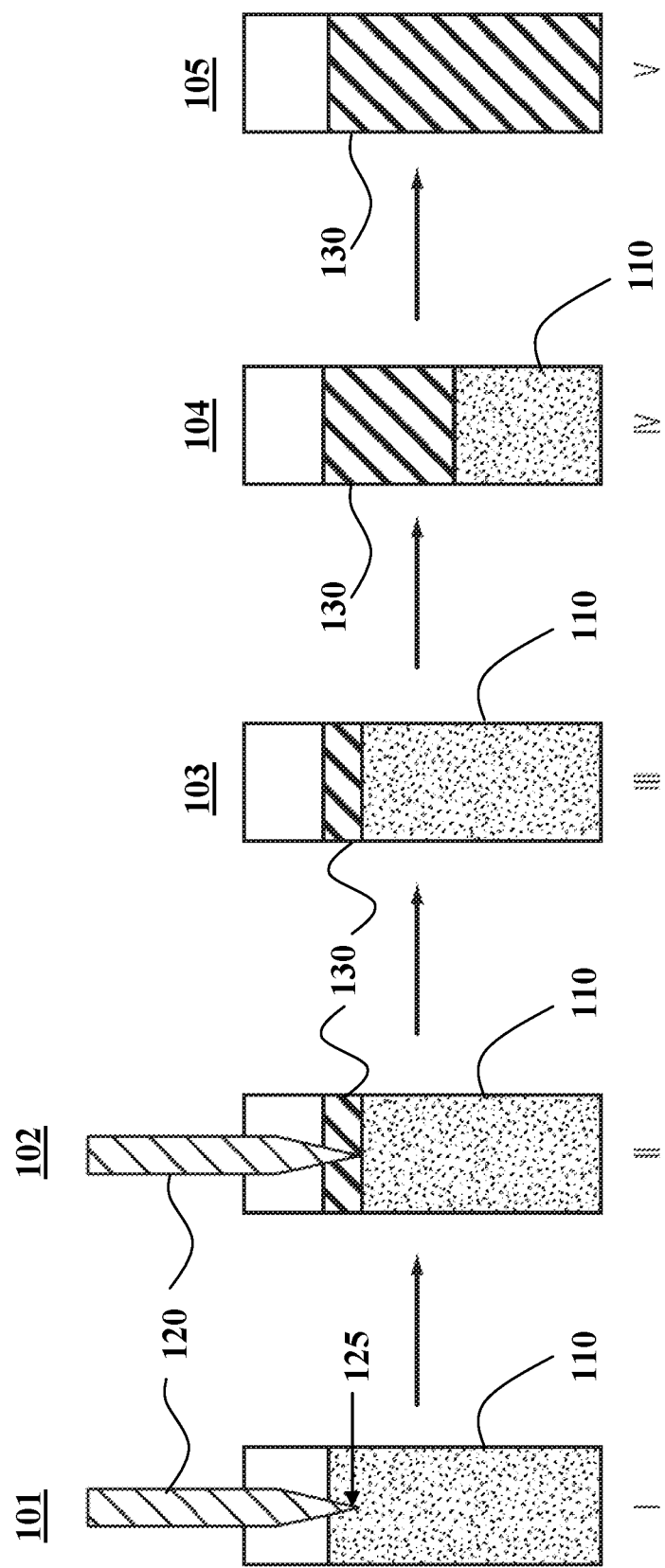
FIG. 1 depicts a schematic of direct thermal-contact triggered frontal polymerization, the principles of which may be applied in some embodiments.

The compositions, formulations, methods, apparatus, and systems of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

This invention is premised, at least in part, on the discovery of a solution to the problem (in conventional approaches) that frontal polymerization is triggered by direct physical contact to heating sources or by line-of-sight exposure to light. Variations of this invention utilize remote and blind triggering mechanisms, preferably based on induction heating, to initiate frontal (also known as frontally cured) polymerization. These variations allow adhesives to bond optically opaque parts, for which conventional approaches are inferior or do not work at all.

Frontal polymerization systems are those that when subjected to a trigger, the curing of the formulation will start locally. The trigger may then be removed. The curing front will propagate outward by virtue of the initial reaction heat. Frontal polymerization systems known in the art can be triggered by direct contact with heating sources (e.g. a soldering iron). UV light-triggered frontal curing is also known. The latter can be applied in a remote fashion, but line-of-sight exposure to the monomer is required.

This invention, in some variations, discloses formulations (compositions) and processes to utilize frontal polymerization systems triggered both remotely and without need for line-of-sight with the formulations. Specific embodiments include triggering mechanisms such as induction heating to initiate the frontal curing of polymers, wherein the curing is initiated locally from the induction heating of magnetic and/or conducting particles. When combined with a resin system capable of frontal polymerization, the initial inductive heating trigger may lead to complete curing of the system.

Such a system, which can be (but is not limited to) an adhesive, requires a sufficiently long pot life to be easily workable within the time frame of common industrial manufacturing processes. Preferred resin formulas provide room-temperature pot lives extending to multiple hours in order to provide maximum processing convenience by combining extended workability and rapid cure time.

In some variations, the invention provides a curable formulation (e.g., an adhesive formulation) comprising:

(a) a curable liquid precursor capable of frontal polymerization, wherein the liquid precursor comprises a monomer and a polymerization catalyst; and (b) one or more frontal-polymerization-triggering susceptors in contact with, and/or contained within, the liquid precursor, wherein the susceptors comprise conducting and/or magnetic solid particles capable of induction heating in the presence of a remotely applied electromagnetic field.

In preferred embodiments, the polymerization is step-growth polymerization. Step-growth polymerization refers to a type of polymerization mechanism in which bi-functional or multi-functional monomers react to form first dimers, then trimers, then longer oligomers, and eventually long-chain polymers.

In some embodiments, the polymerization is chain-growth polymerization. Chain-growth polymerization is a polymerization technique where unsaturated monomer molecules add onto the active site of a growing polymer chain one at a time. Chain-growth polymerization includes free-radical polymerization, cationic polymerization, anionic polymerization, and coordination polymerization.

When polymerization is step-growth polymerization, the monomer may be an epoxy resin, for example. Epoxy resins, also known as polyepoxides, are a class of reactive prepolymers and polymers which contain epoxide groups. Epoxy resins may be reacted (cross-linked) either with themselves through catalytic homopolymerization, or with a wide range of co-reactants including polyfunctional amines, acids (and acid anhydrides), phenols, alcohols, and thiols. These co-reactants are often referred to as hardeners or curatives, and the cross-linking reaction is commonly referred to as curing.

Polymerization may be catalyzed with a latent catalyst contained within the liquid precursor. A "latent catalyst" is a substance which is relatively stable, but which becomes activated at a curing temperature to produce a substance having acidic or basic properties. Suitable latent catalysts ought to be readily miscible with the epoxy resin or other monomers. The mixtures ought to remain stable for as long as possible at room temperature under standard storage conditions. The temperatures required for curing are preferably not excessively high, such as below 200° C. Lower curing temperatures allow energy costs to be saved and unwanted secondary reactions avoided.

Latent catalysts available commercially include, for example, adducts of boron trifluoride with amines (e.g., $BF_3$-monoethylamine), quaternary phosphonium compounds, and dicyandiamide. In some embodiments, a latent catalyst comprises a tertiary amine (e.g., an imidazole compound). In these or other embodiments, a latent catalyst comprises a boron trifluoride-amine complex.

The liquid precursor may further comprise an accelerator to speed up the reaction kinetics in the curing process. In some embodiments, the accelerator is or includes a polyol. The polyol may be, for example, a $C_2$-$C_{24}$ polyol, such as ethylene glycol, 1,2-propanediol, 1,4-butanediol, 2,3-butanediol, or a derivative thereof. The accelerator may act as a co-catalyst (e.g., to reduce the activation energy of curing), or may act to enhance the catalytic activity of the polymerization catalyst.

In some embodiments, the susceptors are present at a concentration from about 0.1 wt % to about 50 wt % in the curable formulation, such as a concentration from about 5 wt % to about 25 wt % in the curable formulation. In certain embodiments, the susceptors are present at a concentration of about 0.2, 0.5, 1.0, 1.5, 2, 3, 4, 5, 7.5, 10, 15, 20, 25, 30, 35, 40, 45, or 50 wt %, including any intermediate ranges between these recited values (such as 0.5-5 wt % or 2-30 wt %).

Figure 2:
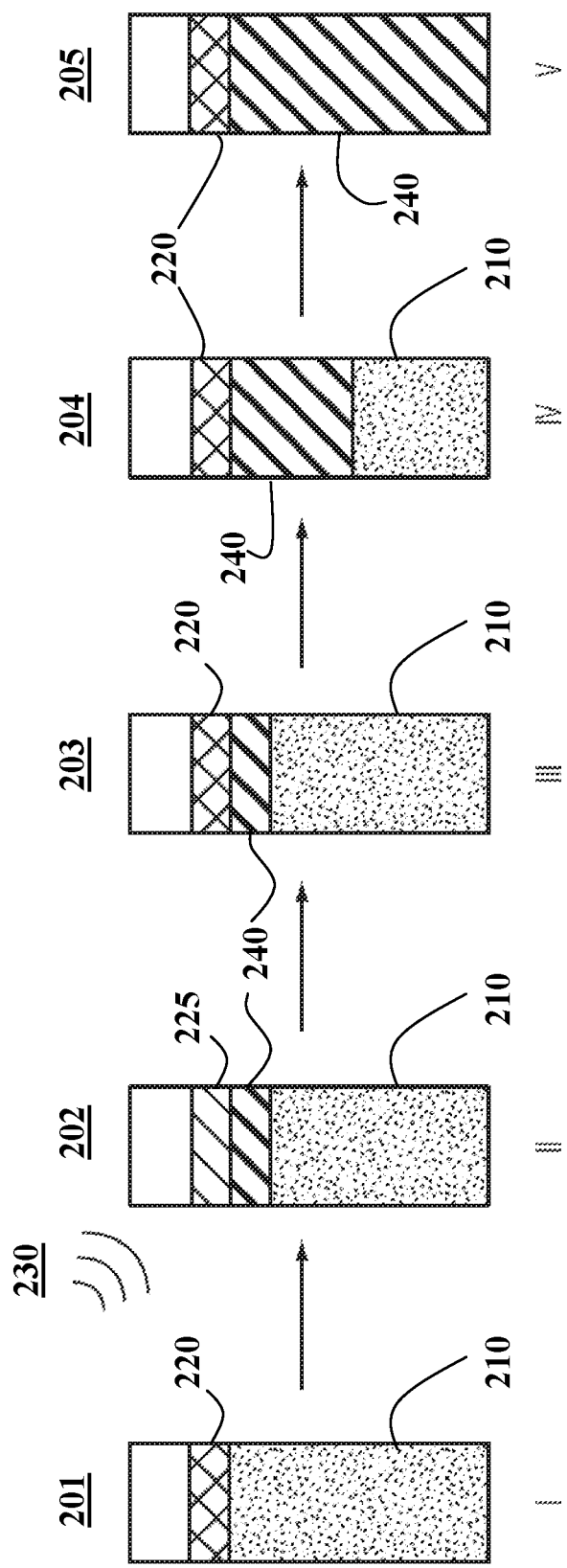
FIG. 2 depicts a schematic of remotely blind-triggered frontal polymerization, according to some embodiments of the invention.
Figure 3:
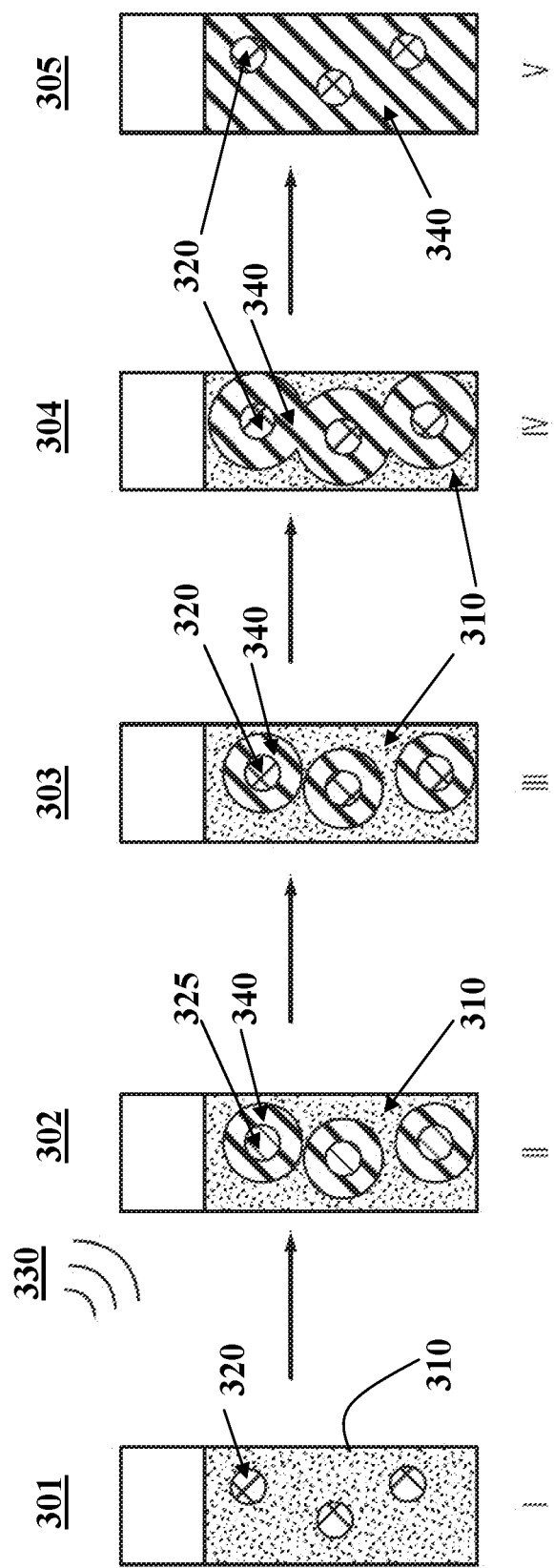
FIG. 3 depicts a schematic of remotely blind-triggered frontal polymerization, according to some embodiments of the invention.

In some embodiments, the formulation comprises a single susceptor region or layer adjacently disposed in contact with the liquid precursor (as depicted in FIG. 2). In these or other embodiments, the formulation comprises multiple susceptors dissolved and/or suspended within the liquid precursor (as depicted in FIG. 3).

The conducting and/or magnetic solid particles may contain a material selected from the group consisting of iron, nickel, zinc, chromium, oxides or alloys containing iron, oxides or alloys containing nickel, oxides or alloys containing zinc, oxides or alloys containing chromium, carbon, and combinations thereof.

Susceptor materials may also be characterized by magnetic permeability. "Permeability" $\mu$ is a measure of the ability of a material to support the formation of a magnetic field within itself. "Relative permeability" is the ratio of the permeability $\mu$ of a specific material to the permeability $\mu$ of free space. In some embodiments, selected susceptor materials are characterized by a relative permeability $\mu/\mu_0$ of about 100 or higher, such as about 500, 1000, or higher.

Other variations provide a polymer-curing system comprising:

(a) a curable liquid precursor capable of frontal polymerization, wherein the liquid precursor comprises a monomer and a polymerization catalyst; and (b) one or more frontal-polymerization-triggering susceptors in contact with, and/or contained within, the liquid precursor, wherein the susceptors comprise conducting and/or magnetic solid particles capable of induction heating in the presence of an electromagnetic field or electromagnetic field; and (c) an apparatus configured to remotely produce an alternating electromagnetic field or signal in line-of-sight with at least some of the susceptors, thereby generating induction heating to initiate the frontal polymerization.

"Line-of-sight" between a source and an object means that an electromagnetic signal (photons) is able to travel from the source to the object without quantum tunneling. In some embodiments, the alternating electromagnetic field is in line-of-sight with essentially all of the susceptors present. In these or other embodiments, the alternating electromagnetic field is not in line-of-sight with at least a portion of the curable liquid precursor. In certain embodiments, the alternating electromagnetic field is not in line-of-sight with any of the curable liquid precursor. The electromagnetic field may be out of the line-of-sight with the liquid precursor due to the presence of an opaque barrier, a lack of alignment between electromagnetic field source and liquid precursor region, a source or cause of interference, or other reasons. These embodiments are in contrast to UV ignition, which requires line-of-sight exposure with the curable liquid precursor for curing.

Induction heating works by exposing a conductive or magnetic material to an electromagnetic field. Any material that heats up when exposed to an electromagnetic field is called a "susceptor" material. The electromagnetic field can induce heating through two mechanisms. If the susceptor material is conductive, eddy currents are induced in the conductor, and the conductor will heat due to resistive effects. If the material is magnetic, hysteresis losses from the magnetization-demagnetization process cause heating. This mechanism of heating is called hysteresis heating.

The physics of electromagnetic induction applies to both Joule heating (eddy current losses) and magnetic heating (hysteresis losses). Either mechanism may dominate, or both may be important. In non-conductive, but ferromagnetic materials (e.g., ceramic ferrites), induction heating arises from only magnetic hysteresis, while in conductive, but non-magnetic materials (e.g., aluminum flakes), induction heating arises from eddy currents (Joule heating) while remaining unaffected by the magnetic field. In the case of iron-based ferromagnetic materials, both magnetic hysteresis and eddy current heating contribute significantly to heating. In some embodiments, once local curing starts, the electromagnetic field is turned off and the activated susceptor returns to a non-activated state. In other embodiments, the electromagnetic field remains on for some period of time (optionally, until curing is complete).

The electromagnetic field can be viewed as the combination of an electric field and a magnetic field. The electric field is produced by stationary charges, and the magnetic field is produced by moving charges (currents).

The electromagnetic field or signal may be in, or derived from, an alternating electromagnetic field. That is, an alternating electromagnetic field may be generated to supply the electromagnetic signal to remotely initiate polymerization of the precursor. An alternating electromagnetic field results from alternating current moving through a conductor. In other embodiments, the electromagnetic signal is in, or derived from, a non-alternating electromagnetic field. A non-alternating electromagnetic field results from direct current moving through a conductor.

The electromagnetic field or signal may have a frequency from about 3 kHz to 300 GHz, i.e. radio frequency. In some embodiments, the electromagnetic field or signal has a frequency from about 50 kHz to about 100 MHz, such as about 0.1 MHz to about 10 MHz. In various embodiments, the electromagnetic field or signal has a frequency of about 0.1, 0.2, 0.5, 1, 2, 3, 4, 5, 6, 7, 8, 9, or 10 MHz. Some embodiments employ high-frequency (10 MHz or higher) electromagnetic signals.

The electromagnetic field may be produced using any known apparatus capable of generating an electromagnetic field. For example, an induction unit operates by sending an alternating current through a conductive coil, which then generates an alternating electromagnetic field. The magnitude of the electromagnetic field may be adjusted by increasing the amount of current that enters the coil and thus increasing the electromagnetic field amplitude. For example, an induction unit that is rated between 0 and 3000 W of load power may be adjusted to 1%, 5%, 10%, 20%, or 50% power (as % of maximum power), to adjust the electromagnetic field.

The susceptors may be present at a concentration from about 0.1 wt % to about 50 wt % in the liquid precursor. In certain embodiments, the susceptors are present at a concentration of about 0.2, 0.5, 1.0, 1.5, 2, 3, 4, 5, 7.5, 10, 15, 20, 25, 30, 35, 40, 45, or 50 wt %, including any intermediate ranges between these recited values (such as 0.5-5 wt % or 2-30 wt %).

The system may include a single susceptor region or layer adjacently disposed in contact with the liquid precursor (see FIG. 2 for an illustration, and Example 1 for details of FIG. 2). Following curing, a portion or all of the susceptor region or layer may be removed, since it typically will not mix with the liquid precursor. Alternatively, the system may include multiple susceptors (e.g., susceptor particles) dissolved and/or suspended within the liquid precursor (see FIG. 3 for an illustration, and Example 2 for details of FIG. 3). In some embodiments, the system includes a susceptor region or layer adjacently disposed in contact with the liquid precursor as well as multiple susceptors (e.g., susceptor particles) dissolved and/or suspended within the liquid precursor.

In some embodiments of the system, the conducting and/or magnetic solid particles contain a material selected from the group consisting of iron, nickel, zinc, chromium, oxides or alloys containing iron, oxides or alloys containing nickel, oxides or alloys containing zinc, oxides or alloys containing chromium, carbon, and combinations thereof. In some embodiments, selected susceptor materials are characterized by a relative permeability $\mu/\mu_o$ of about 100 or higher, such as about 500, 1000, or higher.

In some embodiments, the susceptors comprise magnetic powder with Curie temperature-limited heating. These materials use hysteresis heating and, if all other heating effects are dominated by the hysteresis heating, will not heat beyond their Curie temperature (the temperature at which a material's permanent magnetism changes to induced magnetism). Magnetic powders (e.g., ferrite-based powders) may be chosen whose Curie temperature can be matched to the desired processing temperature of the adhesive system.

The monomer may be, but is not limited to, an epoxy resin. In some embodiments, the monomer is not a vinyl monomer. The polymerization catalyst may be a latent catalyst, such as a latent catalyst comprising a tertiary amine (e.g., an imidazole compound) and/or a boron trifluoride-amine complex. In some embodiments, the liquid precursor further comprises an accelerator, such as a polyol.

Some embodiments provide a method of curing an adhesive joint, the method comprising:

(a) selecting a curable liquid precursor capable of frontal polymerization, wherein the liquid precursor comprises a monomer and a polymerization catalyst;

(b) selecting frontal-polymerization-triggering susceptors to initiate polymerization upon remote command, wherein the susceptors comprise conducting and/or magnetic solid particles capable of induction heating in the presence of an electromagnetic field;

(c) combining the curable liquid precursor and the susceptors, to generate a mixture;

(d) transferring the mixture to an adhesive joint; and (e) applying an electromagnetic signal to remotely initiate polymerization of the precursor, wherein the electromagnetic signal, due to an opaque barrier, is not in line-of-sight with at least a portion of the curable liquid precursor.

In some methods, the electromagnetic signal is not in line-of-sight with any of the curable liquid precursor. Note, however, that this is not a requirement for the method to work. Rather, it represents a practical configuration of remote curing, despite an opaque barrier (if present), that is enabled by the susceptors and electromagnetic signal.

Induction heating is the process of heating an electrically conducting object (usually a metal) by electromagnetic induction, where eddy currents are generated within the metal and resistance leads to Joule heating of the metal. An induction heater includes an electromagnet, through which a high-frequency alternating current is passed. Heat may also be generated by magnetic hysteresis losses in materials.

The susceptors are present at a concentration from about 0.1 wt % to about 50 wt % in the mixture, in some embodiments. The mixture may include a single susceptor region or layer adjacently disposed in contact with the liquid precursor. Alternatively, or additionally, the mixture may include multiple susceptors dissolved and/or suspended within the liquid precursor.

In steps (c)-(e), the mixture may be characterized by a room-temperature "pot life" which allows sufficient time before applying, to the mixture, an electromagnetic signal to cause heating for remotely initiating polymerization. In some embodiments, the pot life is from about 0.1 hr to about 24 hr, such as about 0.5 hr to about 12 hr, or about 1 hr to about 9 hr.

Some embodiments provide a method of curing a polymer, the method comprising:

(a) selecting a curable liquid precursor capable of frontal polymerization, wherein the liquid precursor comprises a monomer and a polymerization catalyst;

(b) selecting frontal-polymerization-triggering susceptors to initiate polymerization upon remote command, wherein the susceptors comprise conducting and/or magnetic solid particles capable of induction heating in the presence of an electromagnetic field;

(c) combining the curable liquid precursor and the susceptors, to generate a mixture; and (d) applying an electromagnetic signal to remotely initiate polymerization of the precursor, wherein the electromagnetic signal, due to an opaque barrier, is not in line-of-sight with at least a portion of the curable liquid precursor.

EXAMPLES

Various embodiments of the invention will now be further described by reference to the Examples and accompanying drawings (FIGS. 1-3), which are non-limiting examples and drawings for illustration purposes.

Example 1: Remotely Blind-Triggered Frontal Polymerization

An illustration of soldering iron-induced frontal polymerization is shown in FIG. 1. In step I (schematic 101), a hot soldering iron 120 is immersed into an uncured liquid 110 contained in a tube. Alternatively, the soldering iron 120 may contact the outside wall of the tube. This direct contact to a heat source 120 induces a local hot spot at the contact point 125. When sufficient heat is built up locally, curing will start, as depicted in step II (schematic 102). Once the localized curing starts, the soldering iron 120 can be removed in step III (schematic 103). Due to the exothermic nature of the curing, the local fast curing produces sufficient heat that induces curing in its proximity 130, which further produces heat due to the release of the latent reaction energy. This process results in the self-propagation of the reaction front (of cured polymer 130) as shown in step IV (schematic 104), leading eventually to the curing of the entire system 130 as shown in step V (schematic 105). Alternatively, the initial trigger can be a UV source, when the system is UV curable. Again, when the curing reaction is triggered locally by UV light, the light can be removed, yet the curing can self-propagate via heat released from the curing reaction.

Bisphenol A diglycidyl ether (EPON 825) is obtained from Momentive, polyethylene glycol diol (diol, molecular weight of 200) and 1,2-dimethylimidazole (DMI) are purchased from Aldrich. All regents are used as received.

The exact formulations of various curing mixtures are provided in Table 1. In a typical experiment, weighed epoxy resin EPON 825 (main component), PEO-diol (accelerator), and dimethylimidazole (catalyst) are mixed in a 30 mL glass vial. The pot life of each formulation in Table 1 is evaluated by leaving the mixture under ambient conditions (i.e. room-temperature aging). None of the three formulations shows visible change in flowability before and after aging for 8 hours, signifying a pot life longer than 8 hours.

To evaluate the curing speed of each formulation, two drops of the liquid mixture are added into an aluminum dish using a pipette. The aluminum dish is immediately put into an oven preset at a certain temperature. Upon gelation, the curing mixture suddenly becomes dark, accompanied by solidification. The sudden change in darkness is used as the indicator of cure time. As such, the curing time of the different formulations are provided in Table 1.

TABLE 1

Fast cure epoxy adhesive formulations.

| No. | EPON | DMI | Diol | Cure time 130° C. | Cure time 150° C. |
|---|---|---|---|---|---|
| 1 | 10 g | 0.6 g | 1 g | 75 s | 45 s |
| 2 | 10 g | 0.6 g | 2 g | 60 s | 45 s |
| 3 | 10 g | 0.6 g | 0 g | 180 s | 90 s |

The data in Table 1 show that addition of the diol significantly accelerates the curing, while maintaining pot life longer than 8 hours. For the same formulation, curing at 150° C. is also noticeably faster than curing at 130° C. Both formulations 1 and 2 in Table 1 cured around 45 seconds at 150° C.

Direct Thermal Contact Initiated Frontal Curing

Following the scheme shown in FIG. 1, the direct thermal-contact-initiated frontal polymerization of formulation 1 (Table 1) 110 is evaluated by immersing the tip of a soldering iron 120 (at a temperature of about 260° C.) into the vial that contains the liquid 110. After about 1 minute of the direct thermal contact, the top layer of the liquid becomes significantly darkened, signifying the start of the frontal polymerization (producing polymer 130). At this point, the soldering iron is removed completely from the vial. The curing front 130, as indicated by the darkening line, is observed to propagate on its own until completion. The frontal propagation speed for this formulation is roughly 0.5 cm/min.

Remote Induction-Induced Thermal Curing

About 5 vol % of iron particles are dispersed in the epoxy adhesive (epoxy resin EPON 825). A small drop of the resulting mixture is put in between two glass slides. A high-frequency magnetic field (Power Cube 32/900 Generator, 2.8 kW, 750-1150 kHz, manufactured by Ceia) placed close to the glass slides (no direct contact) is turned on. Within 20 seconds, the adhesive becomes very dark, indicating its curing. The field is then turned off. Upon completion of this process, the glass slides are found to adhere to each other well.

Remote Induction Induced Frontal Curing

In this Example 1, induction heating-induced fast curing and direct heating-induced frontal curing have been demonstrated separately. By combining these two approaches, induction heating-induced (a remote and blind actuation) frontal curing may be carried out.

Some embodiments of a process of remote induction-induced frontal curing are illustrated in FIG. 2. An induction susceptor 220 may be placed in contact with the top of a curing liquid 210 in a glass vial, in step I (schematic 201). A remote non-contact induction unit that generates an electromagnetic field 230 is turned on, which activates the susceptor 225 and triggers local curing of polymer 240 in step II (schematic 202). Once the local curing starts, the electromagnetic field 230 may be turned off so that the activated susceptor 225 returns to its non-activated form 220 in step III (schematic 203). The frontal curing mechanism allows the curing to self-propagate in step IV (schematic 204) until the curing comes to completion in step V (schematic 205) to produce a cured polymer 240.

Example 2: Remotely Blind-Triggered Frontal Polymerization

Whereas the susceptor in Example 1, FIG. 2 is a bulk material, the susceptor may also be in the form of particles suspended within the adhesive. This alternative process is illustrated in FIG. 3.

A plurality of induction susceptor particles 320 are dispersed within a curing liquid 310 in a glass vial, in step I (schematic 301). A remote non-contact induction unit that generates an electromagnetic field 330 is turned on, which activates the susceptors 325 and triggers local curing of polymer 340 in step II (schematic 302). Once the local curing starts, the electromagnetic field 330 is turned off and the activated susceptors 325 return to non-activated form 320 in step III (schematic 303). The frontal curing mechanism allows the curing to self-propagate in step IV (schematic 304) until the curing comes to completion in step V (schematic 305) to produce a cured polymer 340.

The operating steps in FIG. 3 are similar to the steps shown in FIG. 2. However, due to the dispersion of the induction susceptor particles within the adhesive, the initial curing also occurs within the vicinity 340 around the multiple particles 320. This triggers multiple reaction fronts 340 (shown in FIG. 3 as three distinct reaction zones for illustration purposes only) within the adhesive. The multiple reaction fronts 340 within the curing mixture allows complete curing within a shorter period of time compared to the process outlined in FIG. 2.

Example 3: Remotely Blind-Triggered Frontal Polymerization

The effectiveness of the methods described in Examples 1 and 2, and in FIGS. 2 and 3, is validated by comparing three resins with similar curing mechanisms that display slightly different frontal cure properties (Table 2). Resin 1 is composed of a common epoxy resin (Epon 828, Momentive) and a curing catalyst (B-110, Leepoxy Plastics). Epon 828 is bisphenol A diglycidyl ether. B-110 is a $BF_3$-amine adduct. Resin 2 is modeled after Resin 1 but is doped with an epoxy that cures with a greater exotherm than Epon 828, trimethylolpropane triglycidyl ether (TMPTGE, Sigma). Resin 3 is a version of Resin 1 diluted with 10% poly(ethylene glycol) (PEG, Sigma). Each resin is tested for its frontal curing properties for fronts proceeding downward or upward as in FIG. 2 as well as outward away from a point source as in FIG. 3.

TABLE 2

Frontal polymerization speeds for Resins 1, 2, and 3.

| | Frontal Geometry | | | | |
|---|---|---|---|---|---|
| Resin | Downward Large* (mm/min) | Downward Medium* (mm/min) | Downward Small* (mm/min) | Upward Large* (mm/min) | Spherical Large* (mm/min) |
| Resin 1 | 24.0 | 20.3 | 11.2 | 7.8 | Complete** |
| Resin 2 | 17.1 | 15.5 | 10.5 | 7.1 | Incomplete |
| Resin 3 | 15.0 | 14.7 | Incomplete | Incomplete | Incomplete |

*Large = 2.5 cm vials; Medium = 1 cm vials; Small = 0.5 cm vials (all vial diameters).
**Not calculated; front extended radially at different speeds in different directions.

TABLE 3

Bulk curing properties of Resins 1, 2, and 3 loaded with 15 wt % $Fe_3O_4$, when subjected to varying RF (1 MHz) exposure times.

| Time Exposed to RF (seconds) | Shore D Hardness, Resin 1 | Shore D Hardness, Resin 2 | Shore D Hardness, Resin 3 |
|---|---|---|---|
| 20 | — | — | — |
| 25 | 61 | — | — |
| 30 | 81 | 51 | — |
| 35 | 80 | 69 | — |
| 40 | 78 | 70 | 64 |
| 45 | 78 | 70 | 55 |
| 55 | 77 | — | 60 |

The same resins are then compared for their curing rates when cured via inductive heating of susceptor particles. Resins 1, 2, and 3 are filled with 15 wt % $Fe_3O_4$, and 150 mg of resin is added to a small glass vial and exposed to ~1 MHz RF energy at 10% power. The resulting Shore D hardness values are shown in Table 3 below.

Comparing Tables 2 and 3, it is discernable that Resin 1 is able to frontally propagate upward and radially, in addition to the traditional downward direction. Resin 1 is tuned to propagate away from the susceptor particles. Tuning a resin system for spherical frontal propagation involves a complex analysis of many variables including reaction rate and exothermicity, heat capacity, thermal conductivity, and viscosity. However, the correlation between the bulk spherical frontal propagation effect and the micron-scale curing away from susceptor particles provides, to a skilled artisan, an accessible means of optimizing a resin's effectiveness of curing these systems via RF-activated susceptors.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A method of curing an adhesive joint, said method comprising:
    (a) selecting a curable liquid precursor capable of frontal polymerization, wherein said liquid precursor comprises a monomer and a polymerization catalyst;
    (b) selecting frontal-polymerization-triggering susceptors to initiate polymerization upon remote command, wherein said susceptors comprise conducting and/or magnetic solid particles capable of induction heating in the presence of an electromagnetic field;
    (c) combining said curable liquid precursor and said susceptors, to generate a mixture;
    (d) transferring said mixture to an adhesive joint; and
    (e) applying an electromagnetic signal to remotely initiate polymerization of said precursor,
    wherein said electromagnetic signal is not in line-of-sight with said curable liquid precursor.

2. The method of claim 1, wherein said susceptors are present at a concentration from about 0.1 wt % to about 50 wt % in said mixture.

3. The method of claim 1, wherein said mixture comprises a single susceptor region or layer adjacently disposed in contact with said liquid precursor.

4. The method of claim 1, wherein said mixture comprises multiple susceptors dissolved and/or suspended within said liquid precursor.

5. A method of curing an adhesive joint, said method comprising:
    (a) selecting a curable liquid precursor capable of frontal polymerization, wherein said liquid precursor comprises a monomer and a polymerization catalyst;
    (b) selecting frontal-polymerization-triggering susceptors to initiate polymerization upon remote command, wherein said susceptors comprise conducting and/or magnetic solid particles capable of induction heating in the presence of an electromagnetic field;
    (c) combining said curable liquid precursor and said susceptors, to generate a mixture;
    (d) transferring said mixture to an adhesive joint; and
    (e) applying an electromagnetic signal to remotely initiate polymerization of said precursor,
    wherein said electromagnetic signal, due to an opaque barrier, is not in line-of-sight with any of said curable liquid precursor.

6. The method of claim 5, wherein said susceptors are present at a concentration from about 0.1 wt % to about 50 wt % in said mixture.

7. The method of claim 5, wherein said mixture comprises a single susceptor region or layer adjacently disposed in contact with said liquid precursor.

8. The method of claim 5, wherein said mixture comprises multiple susceptors dissolved and/or suspended within said liquid precursor.

* * * * *